United States Patent
Gkantsidis et al.

(10) Patent No.: US 7,912,948 B2
(45) Date of Patent: Mar. 22, 2011

(54) PEER-TO-PEER MESSAGE FORMAT DATA STRUCTURE

(75) Inventors: Christos Gkantsidis, Cambridge (GB); John Miller, Cambridge (GB); Manuel Costa, Cambridge (GB); Pablo Rodriguez Rodriguez, Barcelona (ES); Stuart Ranson, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 283 days.

(21) Appl. No.: 12/097,963

(22) PCT Filed: Dec. 2, 2006

(86) PCT No.: PCT/US2006/046204
§ 371 (c)(1),
(2), (4) Date: Jul. 14, 2008

(87) PCT Pub. No.: WO2007/075262
PCT Pub. Date: Jul. 5, 2007

(65) Prior Publication Data
US 2008/0301246 A1 Dec. 4, 2008

(30) Foreign Application Priority Data
Dec. 22, 2005 (EP) .................................. 05270100

(51) Int. Cl.
*G06F 15/16* (2006.01)
(52) U.S. Cl. .................... 709/224; 709/223; 709/217
(58) Field of Classification Search .............. 709/224, 709/203, 230, 231, 217; 707/1, 3, 5, 10, 707/100, 104.1; 340/3.1–3.9
See application file for complete search history.

(56) References Cited

U.S. PATENT DOCUMENTS

| 6,987,987 | B1 * | 1/2006 | Vacanti et al. ............. 455/556.2 |
| 2002/0116205 | A1 * | 8/2002 | Ankireddipally et al. ........ 705/1 |
| 2003/0187973 | A1 * | 10/2003 | Wesley ......................... 709/224 |
| 2004/0064568 | A1 | 4/2004 | Arora et al. |
| 2005/0002525 | A1 | 1/2005 | Alkove et al. |
| 2005/0009416 | A1 | 1/2005 | Tanaka |
| 2005/0289237 | A1 * | 12/2005 | Matsubara et al. ........... 709/232 |

FOREIGN PATENT DOCUMENTS

WO  WO2004110020 A1  12/2004

OTHER PUBLICATIONS

EP Search Report P/10816.55EP for Application No. 05270100.0-2413, dated Jun. 27, 2006.
Scholl, "Napster Messages," SP-002249287, dated Apr. 7, 2000, retrieved from <<http://opennap.scourcetorge.net>> 26 pages.

* cited by examiner

*Primary Examiner* — Wing F Chan
*Assistant Examiner* — Ruolei Zong
(74) *Attorney, Agent, or Firm* — Lee & Hayes, PLLC

(57) ABSTRACT

A wire protocol is described which implements connection management and other methods to give enhanced peer-to-peer content distribution. Connections between nodes can be placed in a "notify" state when they are idle but may soon yield useful content. This notify state is also used together with a content request/response cycle to allow a peer to evaluate content available at a neighbour. If no suitable content is available a notify state is entered. When new content is later received at the neighbour it is able to inform the requesting node to allow it to restart the content request/response cycle.

18 Claims, 5 Drawing Sheets

PEER-TO-PEER MESSAGE FORMAT DATA STRUCTURE

RELATED APPLICATIONS

This application is a National Stage of International Application No. PCT/US2006/0046204, filed 2 Dec. 2006, which claims priority from European Patent Application No. 05270100.0, filed on Dec. 22, 2005. Both applications are incorporated herein by reference.

TECHNICAL FIELD

This description relates generally to communication protocols in a peer-to-peer infrastructure and more specifically to message format data structures to allow structured communication in a peer-to-peer cloud.

BACKGROUND

In the past, large scale content distribution has been carried out using dedicated server farms providing infrastructure-based solutions. In this type of method, each client requiring content forms a dedicated high bandwidth connection to a server at a server farm and downloads-content as required. This type of solution is costly for the content provider who must provide and maintain the server farm. FIG. 1 illustrates this type of solution having servers 1 and clients 2, each client having direct connections to one server. Not only is this type of solution costly for the content provider but it is not robust in that failure at a server prevents content from being provided to many clients. In addition, the solution is not easily scalable because each server supports a limited number of clients.

More recently a new paradigm for content distribution has emerged based on a distributed architecture using a co-operative network in which nodes share their resources (storage, CPU, bandwidth).

Cooperative content distribution solutions are inherently self-scalable, in that the bandwidth capacity of the system increases as more nodes arrive: each new node requests service from, and, at the same time, provides service to other nodes. Because each new node contributes resources, the capacity of the system grows as the demand increases, resulting in limitless system scalability. With cooperation, the source of the file, i.e. the server, does not need to increase its resources to accommodate the larger user population; this, also, provides resilience to "flash crowds"—a huge and sudden surge of traffic that usually leads to the collapse of the affected server. Therefore, end-system cooperative solutions can be used to efficiently and quickly deliver software updates, critical patches, videos, and other large files to a very large number of users while keeping the cost at the original server low.

BitTorrent is an existing peer-to-peer file sharing protocol written by Bram Cohen and currently publicly available under an open source license. Under the BitTorrent algorithm a file for distribution is split into blocks or fragments.

These blocks are distributed to nodes in a cloud in a random order and can be reassembled on a requesting node. Each node downloads missing blocks from other nodes to which it is connected and also provides an upload connection to the blocks it already has.

Despite their enormous potential and popularity, existing end-system cooperative schemes such as BitTorrent, can suffer from inefficiencies in some situations which decrease their overall performance. Such inefficiencies are more pronounced in large and heterogeneous populations, during flash crowds, in environments with high churn, or where co-operative incentive mechanisms are in place. The present invention is concerned with implementing, at a wire protocol level, connection management and other methods to reduce or alleviate some or all of these problems. Peer-to-peer communication, as for other types of communication, relies on the ability to establish and maintain valid connections between selected entities or nodes. The present invention is concerned with wire protocols and message formats for achieving this in simple, efficient, robust, reliable and scalable ways.

In addition to the problems mentioned above, the amount of network traffic can easily overwhelm peers in a content distribution cloud. Message size and structure are important factors affecting a peer's ability to rapidly process messages to reduce delays and the risk of dropping packets.

SUMMARY

This summary is provided to introduce a selection of concepts in a simplified form that are further described below in the Detailed Description. This Summary is not intended to identify key features or essential features of the claimed subject matter, not is it intended to be used to limit the scope of the claimed subject matter.

A wire protocol is implemented for a peer-to-peer content distribution algorithm. The wire protocol uses packets each having a message comprising two or more message elements. These packets are for sending between two nodes in a content distribution cloud. Each message element is stored in a respective payload in the packet and at least one of the message elements is a message header. That message header identifies the message type as being one of an ACK, NAK, Notification, ConnectionRequest, Inactivity, PeerRegister, PeerDeRegister, PeerListRequest, FileRequest, FileResponse, ContentRequest, ContentResponse, BlockRequest and BlockData message. These message types are described in detail later in this document. By using these message types we are able to implement a peer-to-peer content-distribution algorithm in a simple and effective manner.

In one example, one of the message elements comprises a flag field arranged to indicate that one of the nodes is arranged to send a subsequent notification to the other node when a specified event occurs. This provides the advantage that a connection between neighbour nodes in a peer-to-peer cloud can be placed in a "notify" state. For example, when that connection is idle and useful content may in future become available over that connection. By identifying which idle connections are in a "notify" state in this way it is possible to cull idle connections without culling those which may soon yield useful content. Culling connections in this targeted way enables new connections to be formed which gives better performance and increases content distribution through the cloud.

For example, one of the two nodes is a tracker node and a second one of the two nodes is a peer node. A tracker node, also referred to as a registrar node, has information about cloud members. A tracker node helps cloud members to find other cloud members which have required content. The flag field is set in order to initiate a notification from the tracker to the peer when new peer information is available at the tracker.

In another example the two nodes are peer nodes, one peer being a client and one being a server. In this document the terms 'client' and 'server' can indicate roles in a transaction in addition to or instead of a pure server and client. The flag field is set in order to initiate a notification from the server to the client when new content is available at the server.

The flag field can be arranged to indicate that a particular block is partially present at the client. This provides the advantage that downloads can be resumed at the intra-block level by using this information about a particular block being only partially present. For example, to assist with this, the at least one message element further comprises a content description of the partially present block.

We also describe a method of forming a packet at a node in a peer-to-peer content distribution cloud. The packet is for sending to another node in the cloud, and the method comprises:

selecting a plurality of message elements from a specified set of message elements; and storing each message element in a respective payload in the packet.

At least one of the message elements is an element header which identifies the message type as being one of an ACK, NAK, Notification, ConnectionRequest, Inactivity, PeerRegister, PeerDeRegister, PeerListRequest, FileRequest, FileResponse, ContentRequest, ContentResponse, BlockRequest and BlockData message. This provides the advantage that a node in a peer-to-peer content distribution cloud is able to form packets which can be used to implement a content distribution algorithm in a simple and effective manner.

In an example, the specified set of message elements comprises one or more of a message element acknowledgement, a message element negative acknowledgement, a connection request, current status of the peer, details about a content request, a list of end point structures, identification of a content file, details of a file to download, an end point structure, details of content offers from a peer, details of a previously offered content block, fragment of a previously requested block, details about a notification event.

The methods can be carried out using a computer program comprising computer program code means adapted to perform all the steps of any of the methods described above when said program is run on a computer. That computer program can be embodied on a computer readable medium. The methods may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilised. The description sets forth the functions of the example and the sequence of steps for constructing and operating the example. However, the same or equivalent functions and sequences may be accomplished by different examples.

The term "cloud" is used herein to refer to a plurality of nodes in a communications network which have access to a peer-to-peer file distribution protocol and are using that protocol to try to obtain a copy of a particular piece of content such as a file that is being distributed. A cloud is also referred to as a graph in some literature. The nodes in the cloud each have one or more current connections using that protocol to others of the nodes. Thus nodes can join or leave the cloud as they drop or form connections to nodes already in the cloud. The connections need not always be actively used for file distribution although the connections need to be suitable for doing so using the particular protocol, which may or may not use network encoding. The connections can either be one-way or two-way connections. In the particular examples described herein all the connections are one-way such that the clouds are asymmetrical although the invention is applicable to and encompasses symmetrical clouds in which the connections are two-way with single connections supporting traffic in both upload and download directions. Also, a given node can be a member of more than one cloud at a time. For example, a first cloud where nodes are trying to obtain a copy of a video being distributed and a second cloud where the nodes are trying to obtain a copy of a portfolio of digital still images. Clouds can be independent of one another or may overlap partially or fully.

Figure 2:
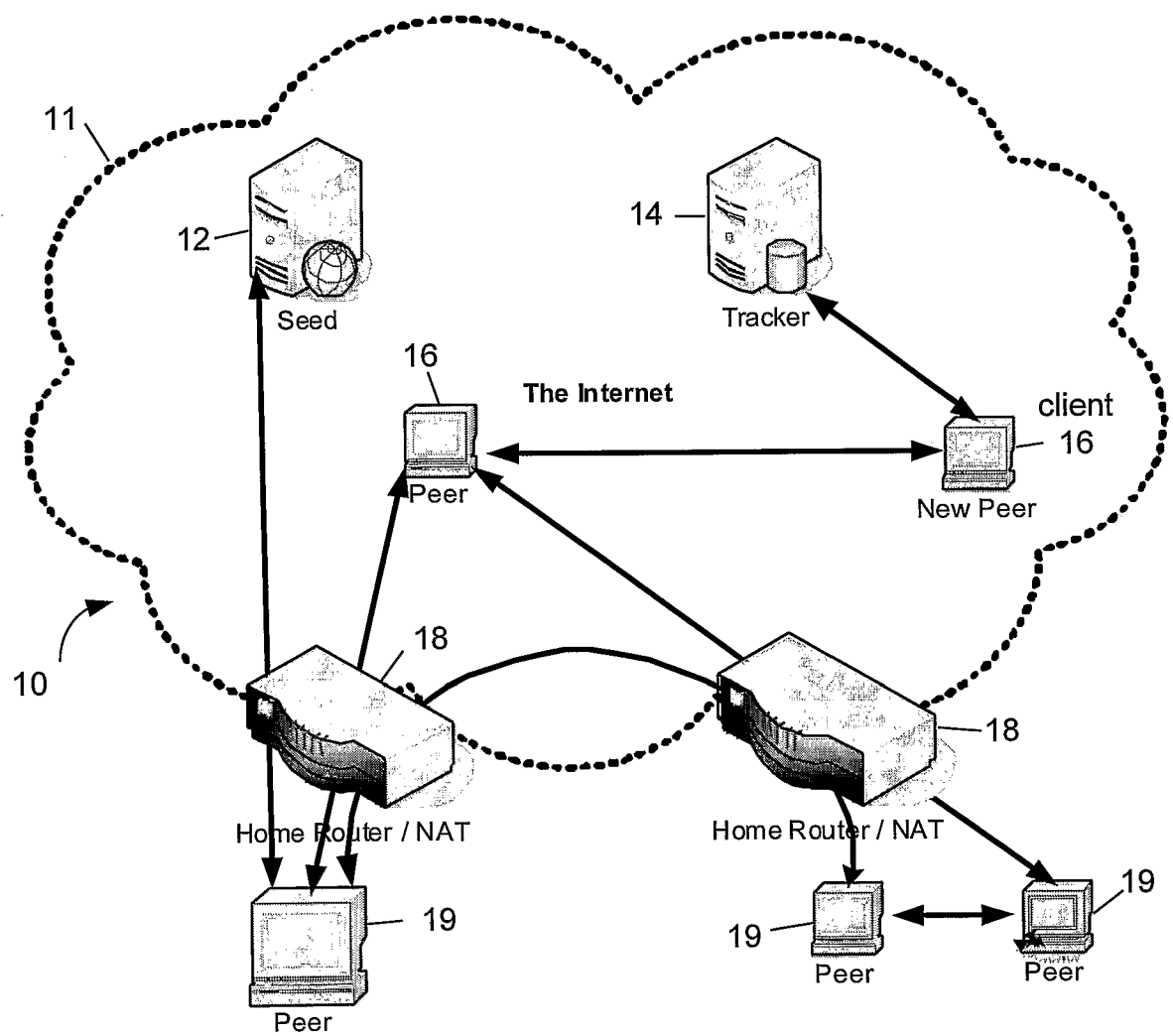
FIG. 2 is a schematic diagram of a peer-to-peer file sharing cloud.

FIG. 2 is a schematic diagram of a peer-to-peer file distribution cloud 10 comprising a plurality of nodes connected via the internet 11 or any other suitable communications network. The cloud itself may comprise many more nodes although for clarity less than ten are illustrated. Also, other nodes may be present connected between or directly to cloud members, although not being peer-to-peer file distribution participants and so not members of the cloud, these are not illustrated.

One or more seed nodes 12 are provided in the cloud 10. A seed node is one from which content, also referred to as files, originates. For example, suppose a company has a product demonstration video which it wishes to distribute publicly to the cloud members. This file can be placed on a seed node. The seed node is typically "always on" such that content files are available to upload from it for significant periods of time (barring maintenance periods etc.). Generally a seed node is active in uploading content and not downloading content. Only a limited and relatively small number of nodes in the cloud can download content from the seed node simultaneously. The seed node may or may not use the peer-to-peer file sharing protocol to upload the content to other members of the cloud. However, those other members go on to share the content or parts of the content with cloud members using the peer-to-peer file distribution protocol. Thus other cloud members can effectively act as seed nodes for periods of time during which they allow content to be uploaded from themselves but do not actively download content during that time. In some cases, once content has been transmitted from the seed node 12 into the cloud 10 the seed 12 can go offline and the cloud 10 will still function.

One or more tracker nodes 14 are provided in the cloud 10. A tracker node 14 has information about cloud members such as whether a peer is participating in the cloud and has any information to share. This tracker node helps cloud members to find other cloud members which have required content.

Figure 1:
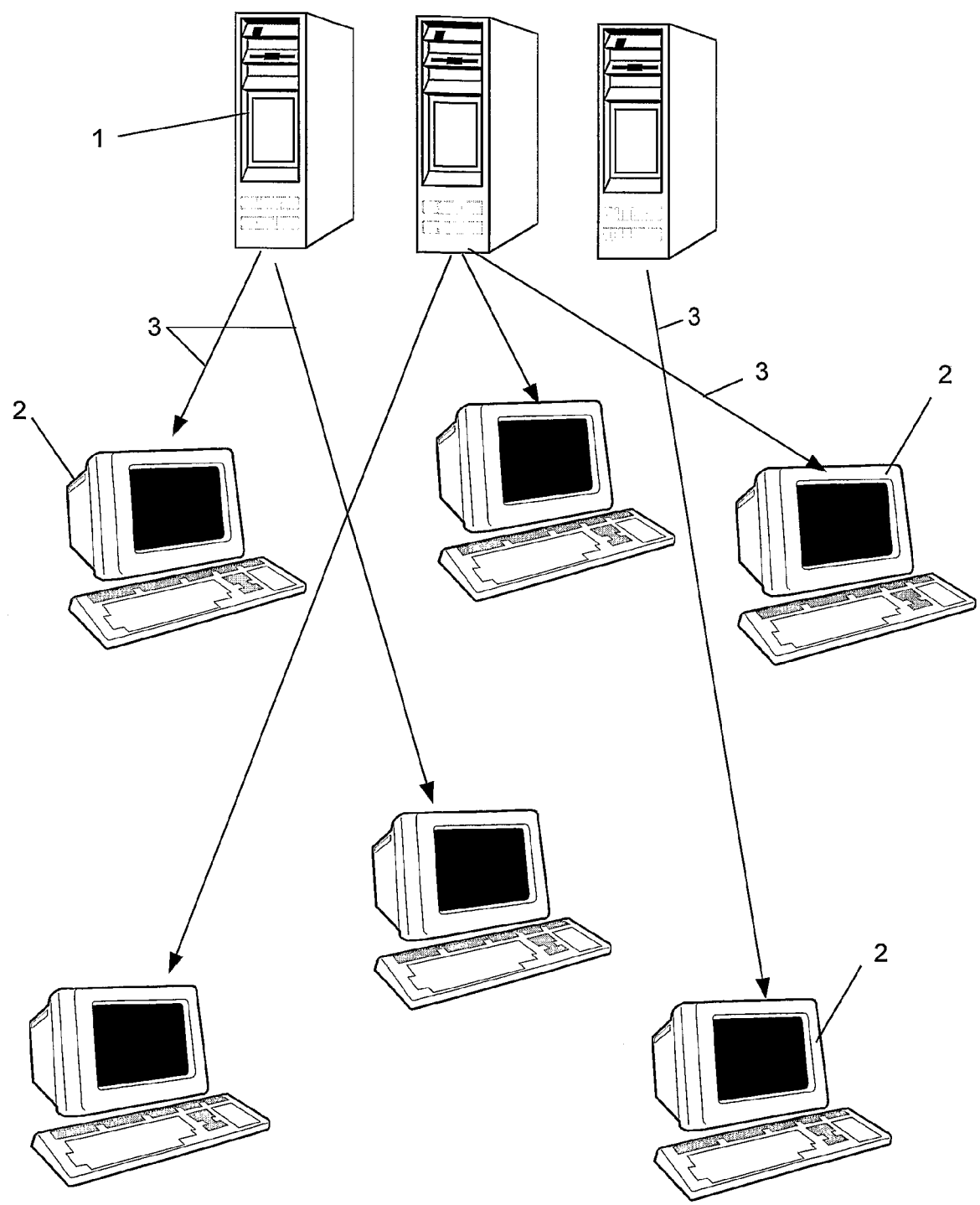
FIG. 1 is a schematic diagram of a content distribution system using a server farm.

A plurality of peer nodes 16, 19, also referred to as clients, are also present in the cloud. A peer node is one which requires the content being distributed in the cloud and which may or may not also share parts of that content which it has obtained. A peer node may act as a temporary seed as mentioned above. In the example illustrated in FIG. 1, peer nodes 16 are located in a public network such as the internet whilst peer nodes 19 are located in private enterprise networks or home networks behind a firewall and/or network address translator (NAT) 18.

The term "leech" is used to refer to a peer which downloads but does not upload content; a leech is a parasite taking from the system and giving little or nothing in return. For example, the leech may be a node which downloads content frequently but which provides little or no upload capability to other peer nodes.

The term "loner" is used to refer to an individual node seeking to join a peer-to-peer content distribution cloud but which has not yet found a minimum number of connections to peers in the cloud.

We specified an overall aim or goal for our peer-to-peer file distribution techniques as enabling all (or a majority of) cloud members to obtain a complete copy of the file being distributed in the shortest possible time. In some cases we also seek to reduce the number of times the seed nodes or originating servers need to provide uploads of the content to be distributed.

With these aims in mind we created a topology management process which involves removing or "tearing down" connections between nodes in certain situations in order to try to replace those connections with more optimal ones. In order to do this we created a number of conditions or rules to be implemented at peer nodes. This is described in our co-pending European patent application, filed simultaneously with the present application, and entitled "Connection management in peer-to-peer content distribution clouds". For example, idle connections are torn down after a specified time period. In order to avoid tearing down connections that are at present idle but which might soon yield useful content we devised a "notify" state for connections in the cloud.

A notify state occurs if a peer requests a download over a connection but the remote peer has no useful content to offer. It can also occur if a peer requests information from a tracker but the tracker has no new peer information to supply. We developed a method for implementing this notify state in a peer-to-peer-messaging protocol as described in more detail below with reference to FIG. 4.

We have developed an extensible data structure for messages suitable for use in a peer-to-peer content distribution protocol. Our peer-to-peer content distribution protocol is designed to operate over any suitable packet-based communications protocol which guarantees ordered delivery such as TCP. Thus communication packets are sent across a transport which guarantees intact, correctly sequenced delivery of data. It does not necessarily guarantee fragmentation and concatenation details.

Each packet of data has a length field at the beginning to allow easy separation of packets from a data stream that may contain part of a packet or multiple packets.

Each packet also comprises a plurality of payloads. These are logical subsections of a packet that allow for protocol expansion. Payloads are stored sequentially in the packet with no padding. Each payload comprises a length and a type along with the data that supports that type. It is possible for there to be no actual data for a particular payload type.

Figure 3:
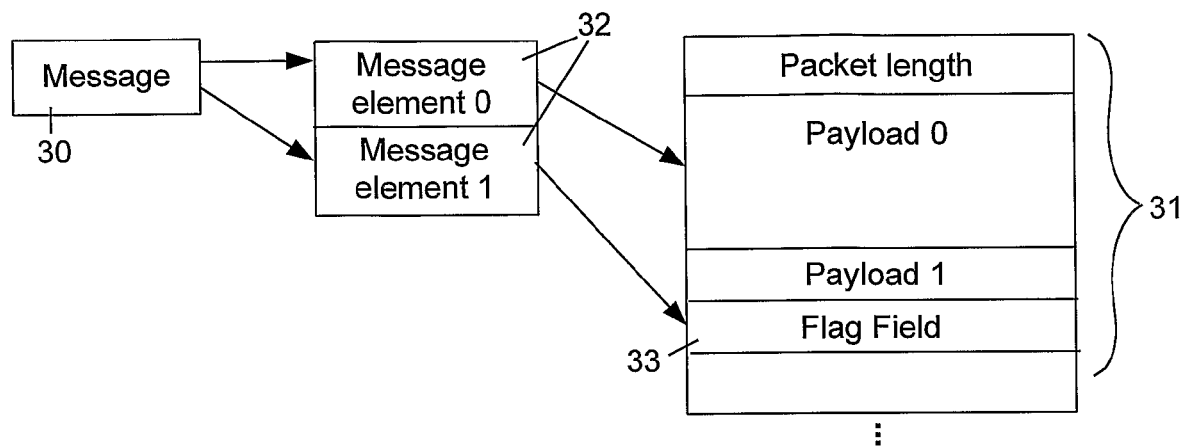
FIG. 3 is a schematic diagram of a message formed from message element showing how those message elements are stored in a packet.

Each message is formed from a plurality of message elements which are forms of payload. FIG. 3 illustrates how a message is formed in this way. A message itself 30 comprises two or more message elements 32 each of which is stored in a payload within a packet 31, part of the packet being shown in FIG. 3. The unique identifier of the message element is stored in the PayloadType field. A message element can comprise a flag field 33 although this is not essential.

Examples of message elements that we have developed and selected for use in our peer-to-peer content distribution protocol are now given:

ELEMENT_HEADER—This is the first message element present on all messages. In some situations it can be the only element present.

ELEMENT_ACK—Details of the message being positively acknowledged.

ELEMENT_NAK—Details of the message being negatively acknowledged. For example, these details comprise the type of message that is being rejected and a code indicating a reason why the message was rejected.

ELEMENT_CONNECTIONREQUEST—Details of the connection request being made. This comprises, for example, information about the protocol version to be used, protocol options if applicable, details of the client application and information about the type of connection. For example, whether the connection is to a tracker or a peer, whether it is an upload or a download connection, and identity details of the content being distributed.

ELEMENT_DATASTATUS—Details about the current status of the peer. It contains information about the state of the content reception, and the performance of the connection session. For example, the number of blocks held, sent, received and the rate of block reception or transmission. Information about whether the peer has enough blocks to decode the original content file and whether the peer has completed the decode of the original content file is also available in some cases.

ELEMENT_CONTENTREQUEST—Details about a content request.

This message element comprises a flags field which is a bit mask, for example, with bits having the following meanings:

NOTIFY_ON_NO_CONTENT—Should no content be made available, then setting this bit results in a subsequent notification being sent to the sending node when new content is available DESIRED_CONTENT_PRESENT—A content description that the server would like has been provided. This is part of the interrupted block recovery system. Should this bit be set then the following is appended to the element. This is mutually exclusive with CURRENT_CONTENT_PRESENT.

CURRENT_CONTENT_PRESENT—A list has been provided of the content currently within the server. This is mutually exclusive with DESIRED_CONTENT_PRESENT.

ELEMENT_ENDPOINTLIST—A list of end point structures.

ELEMENT_FILEIDENTIFICATION—Identification of a content file.

ELEMENT_FILEINFORMATION—Details of a file to download.

ELEMENT_ENDPOINT—An end point structure.

ELEMENT_CONTENTOFFER—Details of content offers from a peer.

ELEMENT_BLOCKREQUEST—Details of a previously offered content block that the server wishes to receive. Note that a block can be specified differently according to the encoding method being used.

Transmission of the block can begin from a given offset in the block and continues to the end of the block.

ELEMENT_BLOCKDATA—A fragment of a previously requested block.

ELEMENT_NOTIFICATION—Details about a notification event. For example, this comprises codes indicating the following types of notification:
  CLOSING_AS_DOWNLOAD_COMPLETE—This connection is being closed as the download has completed and the peer no longer needs to be able to request blocks.
  CLOSING_AS_TOO_SLOW—The connection is being closed as it is deemed to be too slow for continued use.
  CLOSING_AS_DEAD—The connection is being closed as it appears dead.
  CLOSING_AS_CONTENT_DIFFERENT—The connection is being closed as the content offered is different to the content previously downloaded.
  CLOSING_AS_BEHAVIOUR_SUSPICIOUS—The connection is being closed as the peers recent behaviour is suspicious.
  NEW_CONTENT—New content is now present at the server.
  NEW_PEER—New peers have arrived at a tracker.
  CLOSING_AS_BARRED—The connection is being closed as the node is now barred.

ELEMENT_PEERGUID—A simple guid describing a single peer. A GUID is a Globally Unique Identifier which identifies a particular component, in this case a peer.

ELEMENT_PEERLISTREQUEST—Details of a peer list request. This message element comprises flags being a bit mask with bits having the following meanings:
  NOTIFY_ON_NO_PEERS—Should no new peers be available, then setting this bit results in a subsequent notification being sent to the sending node when new peer information is available.

FILEHASH structure—A HASH structure that has been created as a result of hashing the contents of a file.

IDENTHASH structure—A HASH structure that has been created as a result of hashing the contents of a file, along with its filename and creation date/time.

HASH structure—Contains a hash value for a given piece of data.

ENDPOINT structure—The network name and attributes of a node on the network.

URILIST structure—A list of URIs.

URI structure—Specifies a unique network resource location in text form.

GUID structure—A byte sequence that represents a guid as provided by Windows operating system.

HOMOMORPHICHASH structure—A homomorphic hash value with a series of co-efficient values with respective seed values for each block in the content.

ENCODEDCONTENTOFFER structure—Describes a content offer. It contains a count of the number of blocks being described, and an encoding coefficient for each block.

CONTENTBLOCKID structure—Specification of a block depending on encoding method.

DATAENCODINGTYPE—Enumeration of the raw encoding mechanism used. Stored as a byte.

DISTRIBUTIONENCODING TYPE—Enumeration of the encoding type used in the distribution. Stored as a BYTE. It describes where the content is encoded as it is distributed across the cloud.

Figure 4:
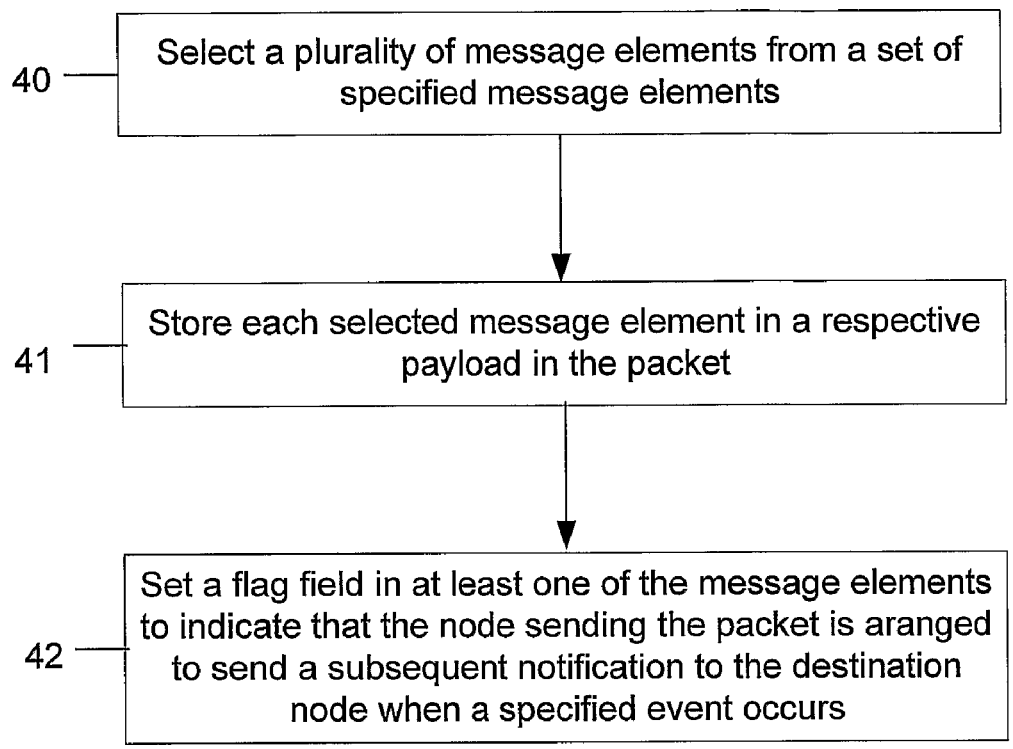
FIG. 4 is a flow diagram of a method of implementing a 'notify' state using message elements.

As mentioned above we developed a method for implementing a notify state in a peer-to-peer messaging protocol as described now with reference to FIG. 4. A method of forming a packet for sending between nodes in a peer-to-peer content distribution cloud is described. A plurality of message elements are selected from a set of specified message elements (see box 40 of FIG. 4). Each message element is stored in a respective payload in the packet (see box 41 of FIG. 4). A flag field is set in at least one of the message elements (see box 42 of FIG. 4) in order to indicate that the node sending the packet is arranged to send a subsequent notification to the destination node when a specified event occurs.

In one example, one node is a tracker and the other a peer. The flag field is set in order to initiate a notification from the tracker to the peer when new peer information is available at the tracker.

In another example, both nodes are peer nodes, one being a client and one a server. The flag field is set to initiate a notification from the server to the client when new content is available at the server.

As mentioned above with reference to FIG. 3 messages are formed from a series of message elements and are stored in the payload structure. Examples of messages that we have selected and developed for use in our protocol are now given:

MESSAGE_ACK—Positive acknowledgement of message reception. This is sent by a receiving client to a sending client as confirmation that a message has been successfully received and accepted.

There is no response to this message.

MESSAGE_NAK—Negative acknowledgement of message reception. This is sent by a receiving client as notification that a message was successfully received; but there is a problem with its acceptance.

There is no response to this message, although the connection may be closed as a result of the message rejection.

MESSAGE_NOTIFICATION—Ad-hoc notification message sent by either end of a connection.

There is no response to this message.

MESSAGE_CONNECTIONREQUEST—Initial message in a connection between two clients. It is sent by the originating node to establish a connection with the receiving node. The receiver of this message can transmit the following responses:
  ACK(MESSAGE_CONNECTIONREQUEST)—Connection accepted.
  NAK(CONNECTIONREQUEST)—Connection rejected with a reason code TOO_MANY_CONNECTIONS, UNSUPPORTED_PROTOCOL, NOT_INITIALISED, BUSY,
  DUPLICATE_ENDPOINT, CONTENTID-NOT_PROVIDED, CONTENTID_DIFFERENT.

MESSAGE_INACTIVITY—Sent by a node when it has detected a period of inactivity on the connection. It is used to check that the other end of the connection is still connected and active. The receiving node should immediately return an acknowledgement. This message can be sent any time after connection has been established. Should the server not receive an acknowledgement within a specified time then the connection is deemed to have died (either due to the connection or the receiving node), and the connection is closed.

The receiver of this message must transmit the following response:

ACK(MESSAGE_INACTIVITY)—Inactivity has been confirmed.

MESSAGE_PEERREGISTER—This message is sent to a tracker to identify that the server wishes to be known as a peer.

Sent to a tracker node to update the tracker as to how the transfer is progressing. It is sent regularly, thus reminding the tracker that the node is still alive, and also allowing information about the nodes progress so far to be updated. This information can be used by the tracker in declaring which peers a node should use.

The receiver of this message can transmit the following responses:

NAK(MESSAGE_PEERREGISTER)—Rejected with a reason code BUSY, DUPLICATE_ENDPOINT.

ACK(MESSAGE_PEERREGISTER)—Registration accepted.

MESSAGE_PEERDEREGISTER—This message is sent to a tracker node to identify that the server no longer wishes to be known as a peer. This is used during peer shutdown to reduce tracker load.

The receiver of this message can transmit the following responses:

NAK(MESSAGE_PEERDEREGISTER)—Rejected with a reason code BUSY, UNKNOWN_ENDPOINT.

ACK(MESSAGE_PEERDEREGISTER)— Deregistration accepted.

MESSAGE_PEERLISTREQUEST—This message is sent to a tracker node to request a list of peers to provide content. PeerListRequest.Count contains the number of peers to provide. A maximum number of peers can be specified which must be greater than 0. A flag is provided that allows a notification to be triggered should there be no peers to be returned. If this is set and no content is to be returned, then this message is rejected with a reason code of NOTIFICATION_PENDING. When new content arrives a notification will be sent to restart the request cycle. If the flag is not set and there are no appropriate peers, then the message is rejected with a reason code of NO_PEER.

A tracker will return as many peers as possible up to the maximum number requested, but the number returned can be less.

The receiver of this message can transmit the following responses:

NAK(MESSAGE_PEERLISTREQUEST)—Rejected with a reason code BUSY, NO_PEER, NOTIFICATION_PENDING.

MESSAGE_PEERLISTRESPONSE—list of peers to use.

MESSAGE_PEERLISTRESPONSE—This message is sent by a tracker to a peer that has requested a list of peers to provide it content. It is possible that the number of peers returned is less than was requested.

The tracker can return a response with zero peers listed in certain conditions.

There is no response to the message.

MESSAGE_FILEREQUEST—This message is sent to a tracker to request details about the content it is providing tracker support for.

The receiver of this message can transmit the following responses:

NAK(MESSAGE_FILEREQUEST)—Rejected with a reason code BUSY, NO_CONTENT, NO_CONTENT_PLEASE_SUPPLY.

MESSAGE_FILERESPONSE—Details of content being provided.

MESSAGE_FILERESPONSE—This message is sent by a tracker in response to a

MESSAGE_FILEREQUEST. It contains details about the file the tracker is providing support for.

There is no response to the message.

MESSAGE_CONTENTREQUEST—This message is sent by a node to a peer to request offers of content.

A flag is provided that allows a notification to be triggered, should there be no appropriate content. If this is set and no content is to be returned, then this message is NAK'd with a reason code of NOTIFICATION_PENDING. When new content arrives a notification will be sent to restart the request cycle. If the flag is not set and there is no appropriate content, then the message is NAK'd with a reason code of NO_CONTENT.

The receiver of this message can transmit the following responses:

NAK(MESSAGE_CONTENTREQUEST)—Rejected with a reason code BUSY, NO_CONTENT, NOTIFICATION_PENDING.

MESSAGE_CONTENTRESPONSE—Details of content being offered.

MESSAGE_CONTENTRESPONSE—This message is sent by a peer in response to a MESSAGE_CONTENTREQUEST message. It contains details of the content offers that the peer is prepared to transmit.

There is no explicit response to the message. It is possible that the data given in the response is incompatible with the requesting peer for various reasons. In this situation the calling peer should terminate the connection and blacklist this peer.

MESSAGE_BLOCKREQUEST—This message is sent to a peer to request previously offered content.

The receiver of this message can transmit the following responses:

NAK(MESSAGE_BLOCKREQUEST)—Rejected with a reason code BUSY, INVALID_BLOCKID, MISMATCHED_ENCODING.

MESSAGE_BLOCKDATA—Actual data for the block requested.

MESSAGE_BLOCKDATA—This message is sent to a peer that previously requested block data.

There is no response to this message.

In a preferred embodiment the "notify" state is used together with a content request/response cycle. Content requests and responses allow a peer to evaluate the content available at a neighbour peer. The content responses comprise an offer of content made by the neighbour. If the requesting node evaluates the offered content as not innovative it is able to make a new content request, this time modified on the basis of the received offer. However, this is not essential. A content request does not necessarily contain any new data indicating what the requestor didn't like about the last content offer. This type of cycle repeats until required content is offered or until the neighbour can find no potential content.

Figure 5:
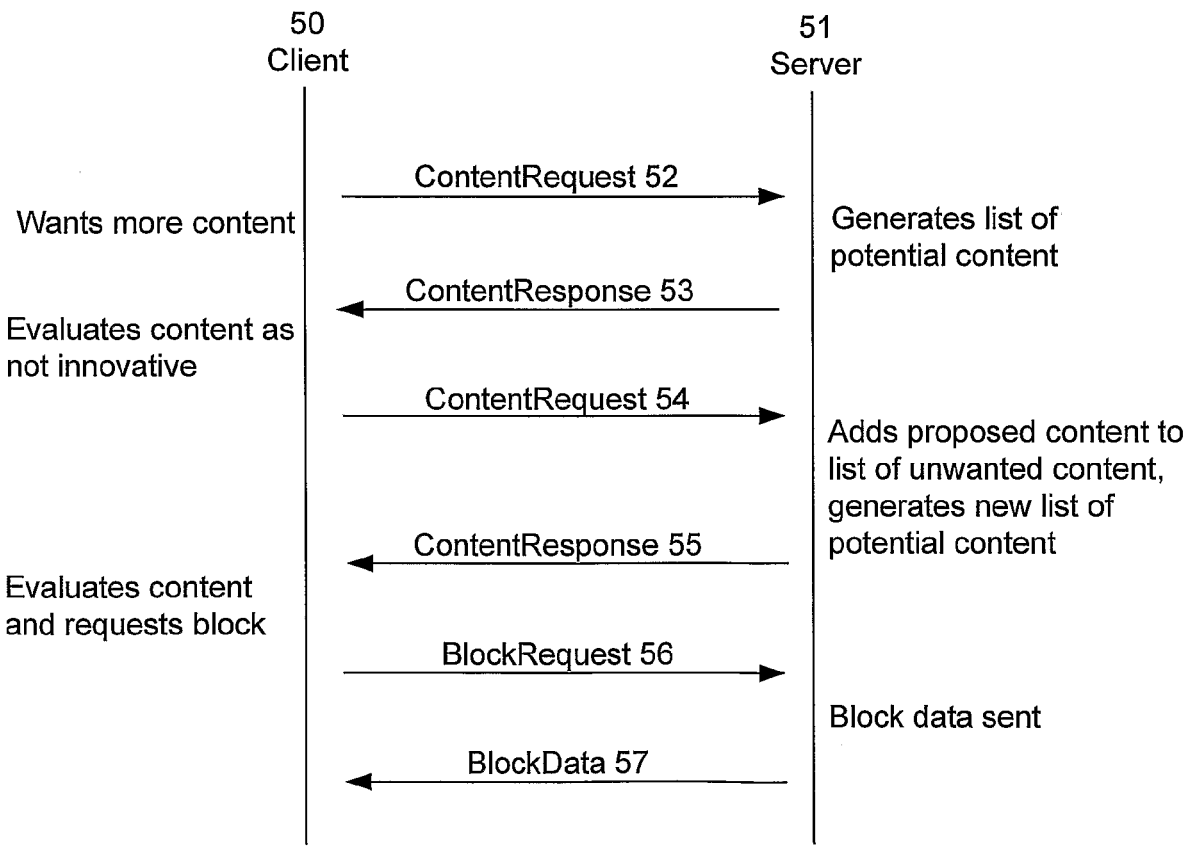
FIG. 5 is a message sequence chart showing a content request/response cycle.

FIG. 5 is a message sequence diagram for a content request/response cycle. A peer node which requires content (referred to in this example as a client 50) is represented as a vertical line. A neighbour node (referred to in this example as a server 51) is also represented by a vertical line. Arrows between the vertical lines represent messages sent between the nodes 50, 51 with the direction of the arrow indicating the direction of the message. Time is represented by height on the page so that arrows nearest the bottom of the page are most recent in time.

Client 50 first sends a content request message 52 to the server. The server 51 generates a list of potential content and sends details of that offered content back to the client 50 in a content response message 53. This content response message does not comprise all of the offered content itself but only information about that content.

If the client 50 evaluates the content as not innovative, that is, it does not require the content because it already has that content, then it sends a new content request message 54 to the server 51. That content request message 54 is modified on the basis of the content response 53 received. For example, the second content request message 54 comprises information along the lines of "I don't want the content you offered before, do you have any different content?". The server 51 generates a new list of potential content and sends details of that to the client in a second content response message 55. This time the client 50 does want the offered content. It sends a block request message 56 to the server detailing the offered block required. The requested block is then sent to the client 50, see message 57.

It should be noted that method steps 54 and 55 of FIG. 5 are not essential. In some versions of our file-distribution protocol the ContentResponse message 53 is almost guaranteed to provide an innovative content offer if the server has innovative content to offer.

Encoded content responses are given a unique identifier such as a guid or other identifier that can be referenced in the block request message to reduce message size. Content offers are tracked at the providing peer to reduce duplicate offers.

Should a client request and receive content offers, then all of the innovative blocks offered are requested and downloaded. Checks are made to remove duplicate block requests when talking to multiple peers.

During the content request/response cycle it is possible that the server can find no potential content. In this situation the content request message is NAK'd.

A flag bit is present in the content request that determines the behaviour of the server in this situation. Should the NOTIFY_ON_NO_CONTENT flag not be set then the content request message is NAK'd with a reason of NO_CONTENT. The client can retry the request after a period of time to see if content is now available. Should the flag bit be set, then the content request message is NAK'd with a reason of NOTIFICATION_PENDING. When new content is received by the server, it sends a notification message with Notification Type NEW_CONTENT to the client allowing it to restart the content request/response cycle with no communications overhead.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

The invention claimed is:

1. A computer-readable memory device having stored thereon instructions that, when executed at a processor, configure the processor to implement:
   a packet, arranged according to a data structure, for sending messages between two nodes in a peer-to-peer content distribution cloud,
   wherein the packet includes a message comprising a plurality of message elements, each message element being stored in a respective payload in the packet and at least one of said message elements being a message header wherein said message header identifies the message type as being one of an ACK, NAK, Notification, ConnectionRequest, Inactivity, PeerRegister, PeerDeRegister, PeerListRequest, FileRequest, FileResponse, ContentRequest, ContentResponse, BlockRequest and BlockData message,
   and wherein at least one of said message elements comprises a flag field arranged to indicate that a connection between the two nodes is in a notify state, the notify state indicating that the connection is idle but useful information is forthcoming on the connection, and indicating that the connection is not to be disconnected.

2. A computer-readable memory device as claimed in claim 1 wherein at least one of said message elements comprises a flag field arranged to indicate that one of the nodes is arranged to send a subsequent notification to the other node when a specified event occurs.

3. A computer-readable memory device as claimed in claim 2 wherein a first one of the two nodes is a tracker node and a second one of the two nodes is a peer node and wherein said flag field is set in order to initiate a notification from the tracker to the peer when new peer information is available at the tracker.

4. A computer-readable memory device as claimed in claim 2 wherein said two nodes are peer nodes, one peer being a client and one being a server, and wherein said flag field is set in order to initiate a notification from the server to the client when new content is available at the server.

5. A computer-readable memory device as claimed in claim 4, wherein said flag field is further arranged to indicate that a particular block is partially present at the client.

6. A computer-readable memory device as claimed in claim 5, wherein said at least one message element further comprises a content description of the partially present block.

7. A method of forming a packet at a node in a peer-to-peer content distribution cloud, said packet being for sending to another node in the cloud and said packet comprising a message, said method comprising:

(i) selecting a plurality of message elements from a specified set of message elements those message elements being associated with the message; and (ii) storing each message element in a respective payload in the packet; wherein at least one of the message elements is an element header which identifies the message type as being one of an ACK, NAK, Notification, Connection Request, Inactivity, PeerRegister, PeerDeRegister, PeerListRequest, FileRequest, FileResponse, ContentRequest, ContentResponse, BlockRequest and BlockData message, wherein at least one of said message elements comprises a flag field arranged to indicate that a connection between the node and the other node is in a notify state, the notify state indicating that the connection is idle but useful information is forthcoming on the connection, and indicating that the connection is not to be disconnected.

8. A method as claimed in claim 7 which further comprises setting a flag field in at least one of the message elements in order to indicate that the node is arranged to send a subsequent notification to the other node when a specified event occurs.

9. A method of forming a packet as claimed in claim 8 wherein said specified event is selected from any of new content arrival at a peer node and new peer information at a tracker node.

10. A method of forming a packet as claimed in claim 8 which further comprises adding information to the flag field to indicate that a particular block is partially present at the node.

11. A method of forming a packet at a node as claimed in claim 10 which further comprises adding a content description of the partially present block to said at least one message element.

12. A method of forming a packet as claimed in claim 7, wherein said specified set of message elements comprises any of a message element acknowledgement, a message element negative acknowledgement, a connection request, current status of the peer, details about a content request, a list of end point structures, identification of a content file, details of a file to download, an end point structure, details of content offers from a peer, details of a previously offered content block, fragment of a previously requested block, details about a notification event.

13. A method as claimed in claim 7, which further comprises evaluating content available at a neighbor node in the peer-to-peer content distribution cloud, said method comprising the steps of, at the peer node:

(i) sending a message to the neighbor node requesting information about content available at that neighbor node;

(ii) receiving a message element from the neighbor node comprising a flag field arranged to indicate that the neighbor is arranged to send a notification to the peer when a specified event occurs.

14. A method as claimed in claim 13, wherein said event comprises new content arriving at the neighbor node.

15. A method as claimed in claim 13 which further comprises: sending another message to the neighbor node requesting information about content available at that neighbor node.

16. A method as claimed in claim 15 which further comprises receiving an offer of content available from the neighbor comprising details of the offered content.

17. A method as claimed in claim 16 which further comprises sending a second message to the neighbor node requesting information about content available at that neighbor node, that second message being modified on the basis of the received offer.

18. A system for forming a packet at a node in a peer-to-peer content distribution cloud, the packet configured to send to another node in the cloud and the packet comprising a message, the system comprising:

a processor; and one or more memory devices communicatively coupled to the processor, the one or more memory devices having stored instructions that, when executed at the system, configure the system to implement steps comprising:

(i) selecting a plurality of message elements from a specified set of message elements those message elements being associated with the message; and (ii) storing each message element in a respective payload in the packet; wherein at least one of the message elements is an element header which identifies the message type as being one of an ACK, NAK, Notification, Connection Request, Inactivity, PeerRegister, PeerDeRegister, PeerListRequest, FileRequest, FileResponse, ContentRequest, ContentResponse, BlockRequest and BlockData message, wherein at least one of said message elements comprises a flag field arranged to indicate that a connection between the node and the other node is in a notify state, the notify state indicating that the connection is idle but useful information is forthcoming on the connection, and indicating that the connection is not to be disconnected.

* * * * *